United States Patent [19]
Doe

[11] 3,858,779
[45] Jan. 7, 1975

[54] BAR FEEDER FOR FEEDING BAR STOCK MATERIAL TO A MACHINE TOOL

[75] Inventor: Ewart Harold Doe, Houghton, nr. Stockbridge, England

[73] Assignee: Twyford Moors Ltd., Hampshire, England

[22] Filed: Mar. 26, 1973

[21] Appl. No.: 344,651

[52] U.S. Cl. ................................ 226/189, 226/199
[51] Int. Cl. .............................................. B65h 5/00
[58] Field of Search .......... 82/2.7; 214/1.1, 1.2, 1.3, 214/1.4, 1.5, 338, 340, 339; 269/104, 287; 198/105, 210, 167; 226/189, 168, 174, 179, 186, 187, 199, 180

[56] References Cited
UNITED STATES PATENTS
3,147,653 9/1964 Jones, Jr. ........................ 214/1.4 X
3,517,844 6/1970 Wloszer ............................. 214/338
3,522,871 8/1970 Jones, Jr. ......................... 198/105 X

*Primary Examiner*—Frank E. Werner
*Attorney, Agent, or Firm*—Markva & Smith

[57] ABSTRACT

A bar feeder for feeding lengths of bar stock material, supported in respective bar holders, to a machine tool comprising an indexable reel having a plurality of longitudinally extending guideways therein; each guideway being formed by a plurality of longitudinally extending members each unclampable and displaceable radially of the guideway to adjust the diameter of the guideway in accordance with the diameter of the bar to be fed and drive means movable sequentially to engage bars extending through the guideways, as the reel is indexed around to position each guideway adjacent the drive means, to move the bars longitudinally through the guideways.

12 Claims, 10 Drawing Figures

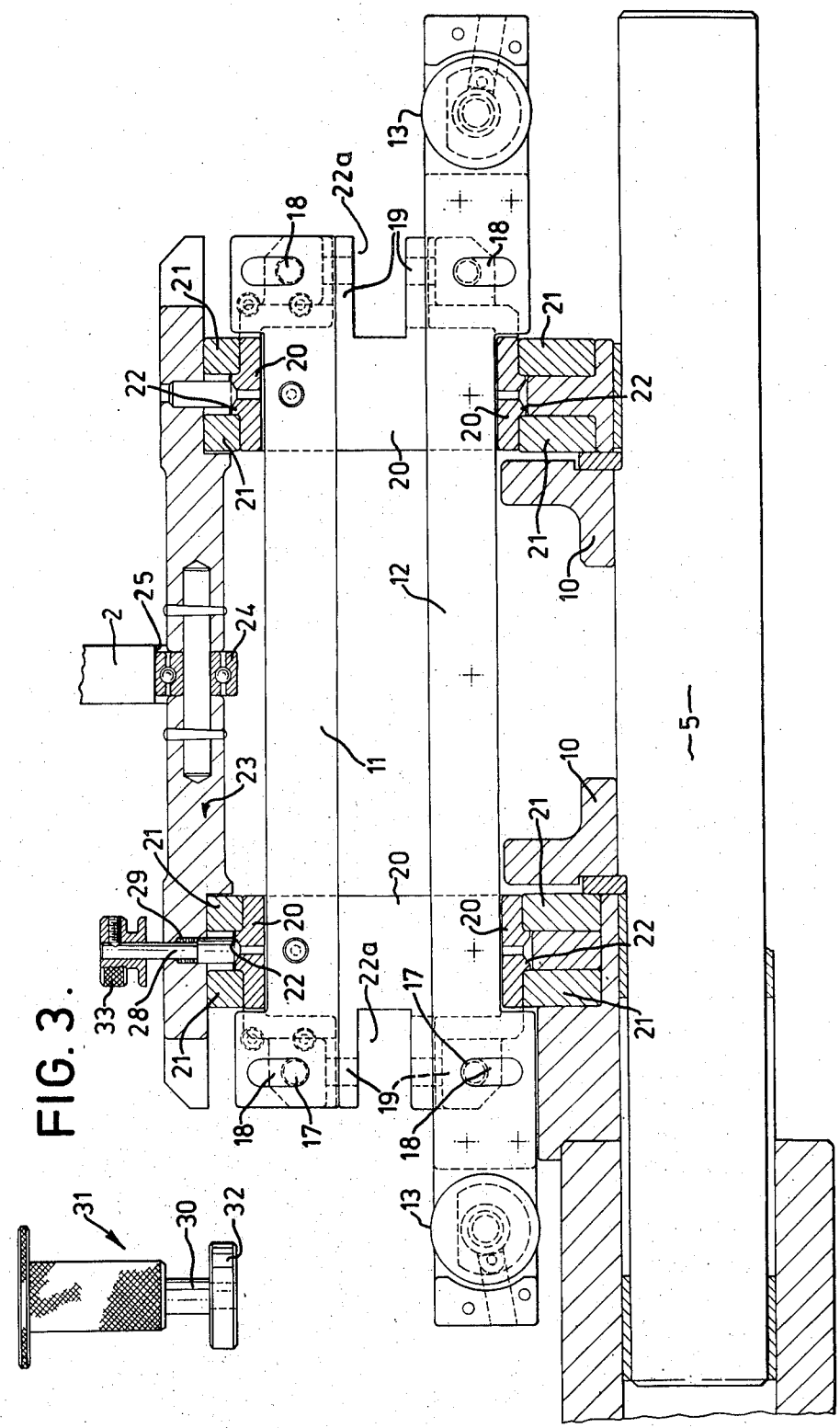

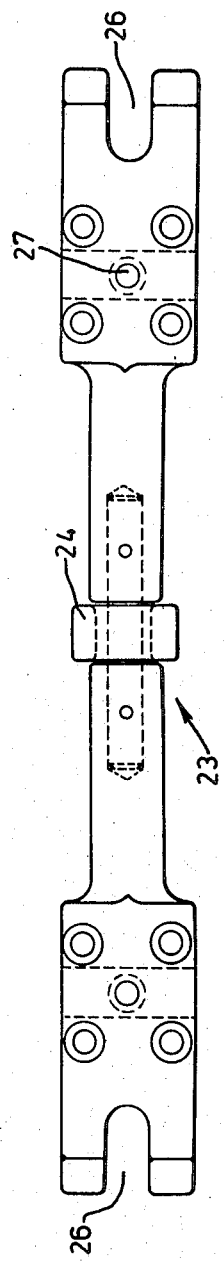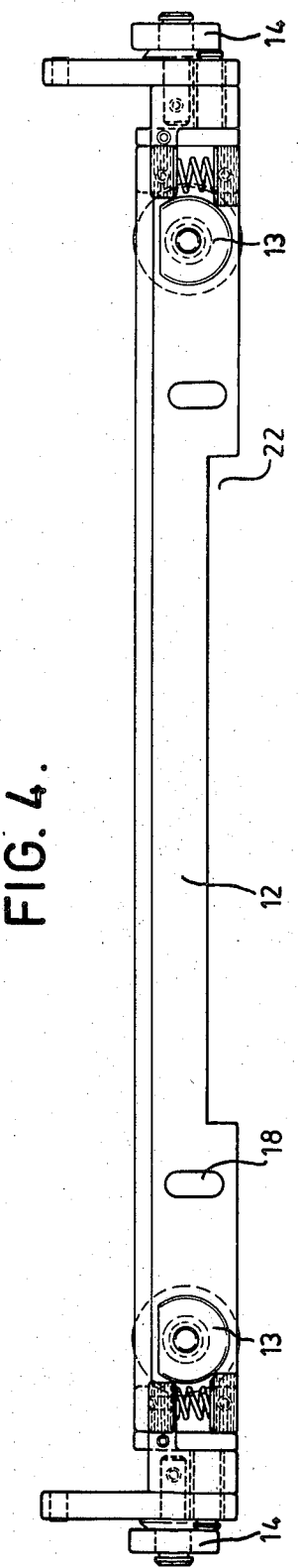
FIG. 5.
FIG. 4.

BAR FEEDER FOR FEEDING BAR STOCK MATERIAL TO A MACHINE TOOL

The invention relates to a bar feeder.

It is advantageous to provide automatic machine tools, particularly single spindle and multi spindle lathes, with a bar holder arrangement which holds lengths of bar stock material to be machined in the machine tool. Bar holder arrangements are described and claimed in our copending applications in United States of America Ser. Nos. 164,403 and 187,985.

Between a bar holder arrangement and the machine tool for which the bar holder arrangement holds bar material, a bar feeder is required to feed lengths of bar stock material through the collets of the machine tool against a dead stop of the machine tool, so that fresh lengths of bar stock material are arranged in the collets and form new workpieces when the collets are closed. In practice, to avoid damage which could possibly occur if the length of bar stock material being fed through the open collet was the tailend of a length of bar stock material whereby closing of the collet might cause the collet to hold only the very end of the bar stock material therein, bar stock material is fed through the collet to the dead stop in a quantity greater than that required for the fresh workpiece and the dead stop is traversed towards the collet before the collet is closed so that the required length of bar stock material to form the new workpiece projects from the collet.

Considerable difficulties arise when the diameter of bar stock material to be machined in the machine tool is changed since, not only must the collet or collets of the machine tool be changed but in previously proposed bar feeders, cooperating circumferentially grooved rollers which engage the bar stock material to feed it through the collet must also be changed and replaced by grooved rollers with a groove therein of a size suitable for the new size of bar stock material to be machined.

Machine tools may well be capable of machining bar stock material of any size between ¼ inch diameter and 1¼ inch diameter and for one-sixteenth of an inch increments in bar diameter, this means that a set of 17 different sizes of grooved rollers must be provided for a bar feeder and, since the bar feeder normally has two pairs of grooved rollers at each end, 68 rollers would be required. Since the machine tool may be required to machine metric sized bar or bars of non-standard size diameters, the required number of rollers may be greatly in excess of 68.

According to the invention, a bar feeder, for feeding bar stock material to a machine tool, comprises a guideway formed by a plurality of longitudinally extending members respectively displaceable outwardly from a centre line of the guideway to adjust the diameter of the guideway and drive means movable to engage a bar extending through the guideway to move the bar longitudinally therein.

Where the bar feeder is to feed bar stock material to a multi spindle automatic machine tool, a plurality of guideways are provided, one aligned with each collet of the machine tool, the guideways being provided in a reel which is indexable around with a machining head of the automatic machine tool and with a bar holder arrangement which holds bars to be fed to the machine tool by the bar feeder.

Advantageously the guideway or each guideway has four longitudinally extending members, each of said longitudinally extending members being clampable at each of its ends in a desired position and unclampable and movable in a direction radially of the guideway to be clamped in a further desired position. Advantageously the guideway or each guideway is rotatable about its own axis to facilitate setting of the longitudinal members at desired radial distances from the centre line of the guideway.

Advantageously the reel includes, adjacent each guideway, a respective fixed longitudinally extending member adjacent which each displaceable longitudinally extending member can be brought to lie.

Cooperating means may be provided on each displaceable longitudinally extending member and on each fixed longitudinally extending member at each end, between which cooperating means a block gauge can be inserted to set the displaceable longitudinally extending members at a desired distance from the centre line of the guideway before clamping them against further movement.

The drive means movable to engage a bar lying in the guideway to move it longitudinally therein, preferably comprise at least one pair of motor driven rollers, advantageously one pair of motor driven rollers at each end of the bar feeder, said rollers being mounted for rotation about an axis perpendicular to the axis of the guideway and being reciprocable in a direction radially of the guideway. Each roller of the pair of rollers preferably has a face to engage the bars in the guideways disposed at an angle of 45° to the axis of rotation of the roller whereby said faces of the pair of guide rollers together form a V with its apex directed towards the axis of rotation of the rollers, means being provided to move the rollers axially relatively to one another to accommodate different sizes of bar to be fed.

In a multiple spindle machine tool, feed of bar stock material through a collet is normally only provided in one or two of the spindle positions and the motor driven rollers are therefore mounted on the frame of the feeder for cooperative engagement with bars in each of the various guideways as they are indexed around in the reel with the machining head of the machine tool.

In some machine tools, when it is desired to replace a collet by a collet of a different size, the collet previously used must be extracted rearwardly of the machining head of the machine tool, that is to say towards the bar feeder. To permit such extraction of collets and replacement by collets of different sizes, a segment of the reel of the bar feeder is mounted in the reel to be removable. Preferably said segment is secured in the reel by dowel pins which extend through apertures in end plates of the reel whereby axial sliding movement of the dowel pins can disengage them from said segment and permit the segment to be removed in a radial direction.

To avoid accidents and injury which could occur if the machining head of the machine tool was indexed around whilst a machinist was effecting adjustments to the bar feeder, a drive arrangement, whereby the reel of the bar feeder is coupled for rotation with the machining head of the machine tool, is broken when said segment is removed. Thus, said drive arrangement preferably comprises a dog-clutch, one part of which is formed by an inner radial end of said segment, whereby removal of said segment uncouples the reel of the bar feeder from the machining head of the machine tool to permit relative rotation therebetween.

Advantageously, each of the displaceable longitudinally extending members is formed by two parallel strips of metal with a strip of nylon sandwiched therebetween, with the radially inner edges of the strips of metal which are remote from the nylon member chamfered at 45°. A bar rotating in the guideway contacts only the edge of the strip of nylon whereby undue noise is avoided.

Each of the guideways preferably includes a hub at each end including lugs in which bolts can engage, the bolts passing through slots in the displaceable longitudinally extending members and comprising means whereby the displaceable longitudinally extending members are clampable at each of their ends.

Preferably the motor driven rollers engage a bar in the guideway at positions on the bar beyond the ends of the guideway, the two rollers of each pair engaging the bar at positions symmetrically on either side of a line passing between two displaceable longitudinally extending members which are radially outermost. Advantageously the two displaceable longitudinally extending members which are radially innermost, each carry at each of their ends a dead roll, that is to say a roller projecting radially inwardly of the guideway slightly beyond the face of the nylon member of the elongated member mounting the rollers and aligned with the nylon member. The dead rolls are each mounted for rotation about an axis perpendicular to the axis of the guideway.

Each of said inner elongated members of each guideway advantageously mounts at each of its ends a spring-loaded nip roller biased towards the nip roller carried on the other inner elongated member by springs, and each pair of nip rollers is so arranged that in their normal position they engage a bar in the guideway to lift the bar out of engagement with the dead rolls.

The motor driven rollers are advantageously reciprocable in a direction radially of the guideway by means of an air cylinder which moves the motor driven rollers radially inwardly of the guideway to a limit position determined by a cam.

When the motor driven rollers are driven inwardly by the air cylinder they press against the bar in the guideway to press the nip rollers apart and allow the opposite side of the bar to that engaged by the motor driven rollers to engage the dead rolls. Rotation of the motor driven rollers drives the bar longitudinally through the guideway, through the open collet of the machine tool with which the guideway is aligned to cause the forward end of the bar to abut the dead stop of the machine tool, which dead stop is in its retracted position. As soon as the bar engages the dead stop it operates a switch in the dead stop to cause the cam limiting the radially inward movement of the motor driven rollers to press the motor driven rollers radially outwardly by, say, five-thousandths of an inch, so that the rollers still "wipe" the bar but do not exert a full force thereon and the bar is lifted by the nip rollers away from the dead rolls. The dead stop of the machine tool is then moved towards the machining head of the machine tool to feed the bar back through the collet until the desired length of bar projects from the collet for forming a new workpiece. A switching operation of the machine tool to cause the collet to close is effective also to move the motor driven rollers out of engagement with the bar so that closure of the constantly rotating collet and consequent "snatching" of the bar up to collet speed, for example 4,000 r.p.m., does not cause marking of the surface of the bar by the dead rolls or the motor driven rollers which have already been disengaged from the bar.

The invention is diagrammatically illustrated by way of example in the accompanying drawings, in which:-

FIG. 3 is a fragmentary sectional side elevation of the bar feeder of FIG. 1;

FIG. 4 is a side view of a displaceable longitudinal member of the bar feeder of FIG. 1;

FIG. 5 is an elevation of a fixed longitudinal member of the bar feeder of FIG. 1;

Figure 1:
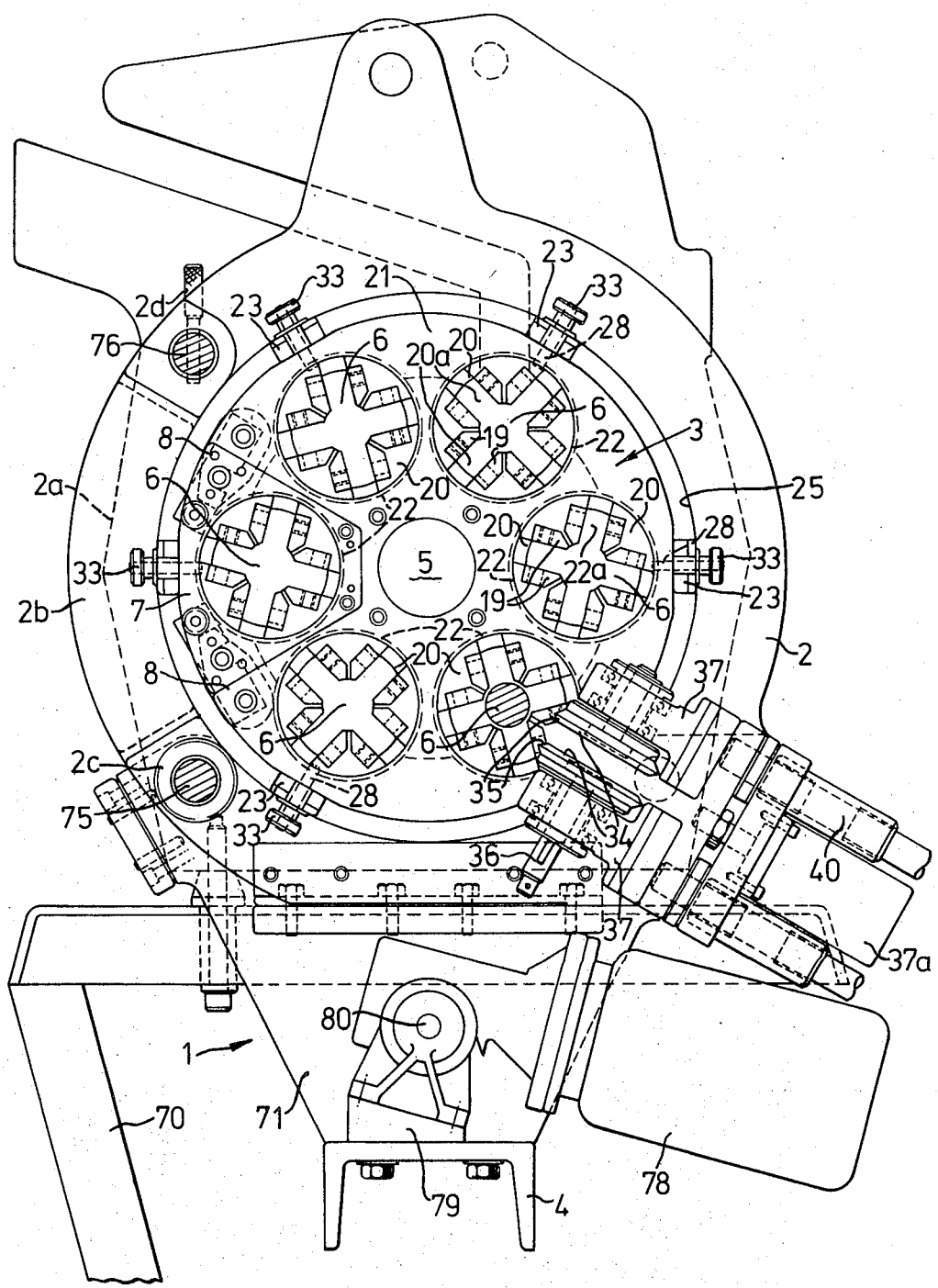
FIG. 1 is an elevation of the front end of a bar feeder according to the invention.

Referring to the drawings, a bar feeder includes a base frame 1 mounting a vertical frame plate 2 in which a reel 3 is mounted for rotation. The base frame 1 is cantilevered out from a bar holder arrangement (not shown), from which the bar feeder is to feed bar stock material to a machine tool (not shown), by means of a channel-shaped support bar 4 and torsion bars of the bar holder arrangement. A shaft 5 at the centre of the reel 3 is coupled to a machining head of the machine tool so that the reel 3 rotates as the machining head of the machine tool is indexed around. As shown, the reel 3 includes six guideways 6 each of which is arranged in axial alignment with a respective collet of the machine tool and with a respective elongated bar holder of a bar holder arrangement. FIG. 1 shows merely mounting means on which elongated members (described hereinafter) of the guideways 6 are mounted.

Figure 2:
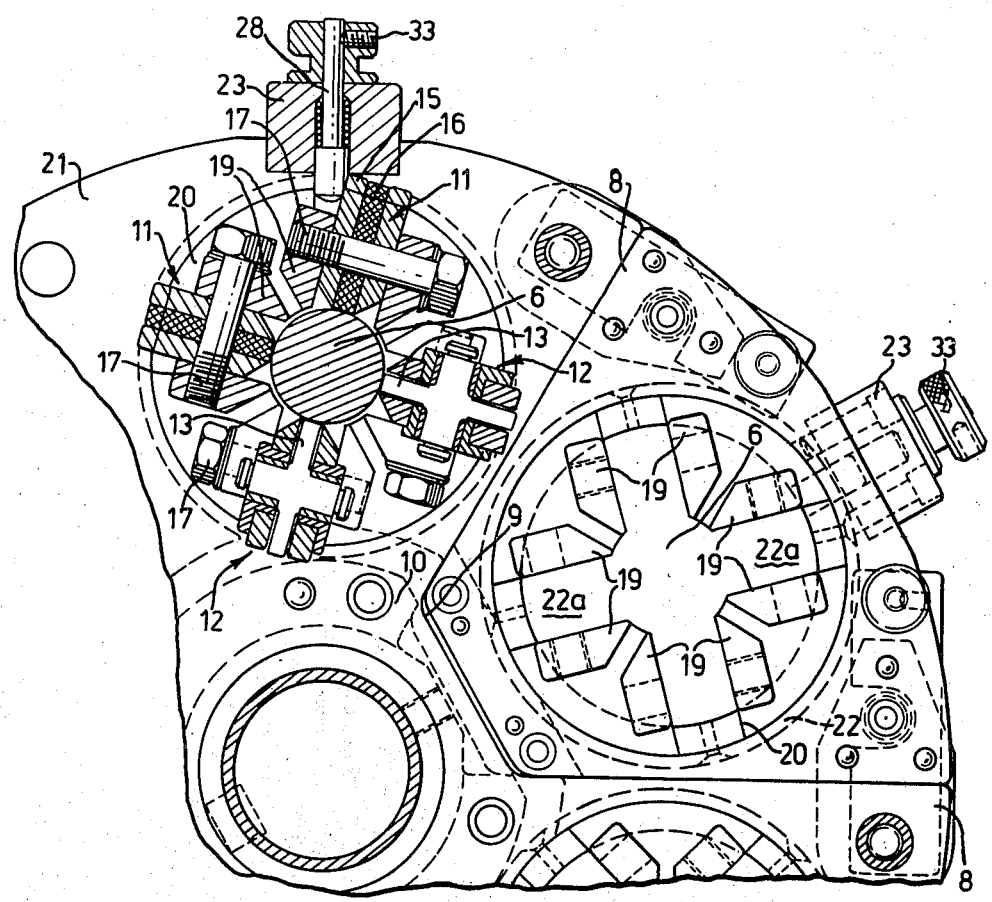
FIG. 2 is a fragmentary rear elevation of part of the bar feeder of FIG. 1.

A segment 7 of the reel 3 is coupled to the remainder of the reel, at each end of the reel, by pairs of sliding pins in an arrangement 8 (FIG. 2) and is removable from the reel 3 whereby a respective collet of the machine tool, aligned with the guideway 6 of the segment 7, can be extracted rearwardly from the machine tool. At its inner radial end the segment 7 engages in recesses 9 in drive rings 10 secured to the shaft 5 to form a dog-clutch arrangement such that when the segment 7 is removed from the reel 3 the shaft 5 can be rotated without the reel 3 rotating. The machining head of the machine tool can thus be indexed around sequentially to align the collets thereof with the space left when the segment 7 is removed so that the collets of the machining head can be sequentially changed and tooling necessary for a new workpiece can be effected on the machine tool, without risk of injury, caused by indexing of the machining head of the machine tool, to any person engaged upon adjusting the reel 3 or the bar holder arrangement.

To permit removal of the segment 7 a portion 2a (FIGS. 1 and 7) of the vertical frame plate 2 is provided to be removable by securing it to a backing plate 2b which is pivotably mounted by a collar 2c on a torsion bar whereby it can be slid axially and then pivoted outwardly after removal of a locking pin 2d.

Each guideway 6 of the reel 3 has four radially adjustable longitudinal members, two radially outer ones of which are referenced 11 and two radially inner ones of which are referenced 12. The difference between the longitudinal members 11 and the longitudinal members 12 is that at each of their ends the longitudinal members 12 each carry a dead roll 13 and a nip roller 14 (not shown in FIG. 1 but described hereinafter), such rolls 13 and rollers 14 not being provided on the longitudinal members 11. Each longitudinal member 11 and 12 comprises two longitudinal strips of metal 15 with a longitudinal strip of nylon 16 sandwiched therebetween. The longitudinal members 11 and 12 are mounted to form the guideways 6 by bolts 17 which extend through slots 18 in the longitudinal members 11, 12 and engage in lugs 19 on mounting hubs 20 of the guideway 6. The lugs 19 and mounting hubs 20 form the mounting means referred to above.

FIGS. 3, 4 and 5 show that the mounting hubs 20, one of which is provided at each end of each guideway 6, are each mounted for rotation in a respective circular aperture in annular discs 21, a pair of the discs 21 being provided at each end of the reel 3. The hubs 20 have axially extending slots 22a in their outer end faces, with the lugs 19 mounted one on each side of the slots 22a, to receive the longitudinal members 11 and 12, the longitudinal members 11 and 12 in FIG. 3 being shown in their extreme outward position. The hubs 20 and the discs 21 are held in aligned axially spaced relation by tie bars passing through the discs 21 and having spacers between each pair of discs 21 to space the pair of discs 21 apart a distance such that annular ribs 22 projecting from the mounting hubs 20 are slidingly received therebetween. The outer edges of the four discs 21 are coupled by six longitudinal members 23, (FIG. 3), one of which is provided adjacent each guideway 6. The six longitudinal members 23 each have a roller 24 at their mid-position whereby the reel 3 is mounted for rotation in a circular aperture in the plate 2, the rollers 24 engaging an inner circumferential face 25 formed by the circular aperture in the plate 2. Part of the face 25 is formed by the radially inner face of the segment 2a. Each of the six longitudinal members 23 has at each of its ends a slot 26 and also an aperture 27 in which a locating pin 28 is mounted and is biased radially inwardly by a spring 29.

The annular ribs 22 of the hubs 20 have recesses therein in which the inner end of the pin 28 can engage. By pulling the pin 28 radially outwardly the pin 28 can be disengaged from the respective hub 20 to allow the respective guideway to be rotated about an axis parallel to the axis of the shaft 5. The guideway 6 can thus be moved through four positions in which the outer longitudinal members 11 and the inner longitudinal members 12 of each guideway 6 are sequentially placed beneath the respective slots 26 in the respective one of the six longitudinal members 23. Thus, the radial position of each of the longitudinal members 11 and 12 can be set by engaging a stem 30 of a gauge 31 (shown in FIG. 3) in the slot 26 in the respective longitudinal member 23 whereby a block gauge 32 can be used to set the distance between a respective outer radial face on the end of the longitudinal members 11 and 12 and an inner radial face of the respective longitudinal member 23. The bolts 17 can be loosened to permit adjustment in the radial direction of the longitudinal members 11 and 12 and can be tightened after setting to secure the longitudinal members 11 and 12 in desired radial positions with respect to the rings 20. None of the four setting positions of the guideway 6, that is to say the positions at which the longitudinal members 11 and 12 are set, is the operating position, the operating position being (as shown in the upper part of FIG. 2) with the pin 28 engaging a recess in the annular rib 22 between the two inner longitudinal members 11. The recesses in the rib 22 in which the pin 28 engages in the setting positions are shallower than the recesses at the operating position and therefore only at the operating position can the pin 28 move radially inwardly a sufficient amount to allow a pull knob 33 at its outer end to lie against a radially outer face of the member 23. If one of the guideways 6 of the bar feeder is in an incorrect position of rotation, this is thus readily apparent and can be corrected before the bar feeder is operated.

The slots 18 in the longitudinal members 11 and 12 are so proportioned that the longitudinal members 11 and 12 can be moved radially inwardly so that a quarter of an inch diameter bar lies with clearance between the inner radial edges of the nylon inserts 16 and can be moved radially outwardly so that a 1¼ inch diameter bar can lie with clearance between the inner radial edges of the nylon inserts 16. Each of the longitudinal members 11 and 12 of the six guideways 6 of the reel 3 can thus be set to a desired radial position according to the size of the bar stock material to be machined.

Figure 6A:
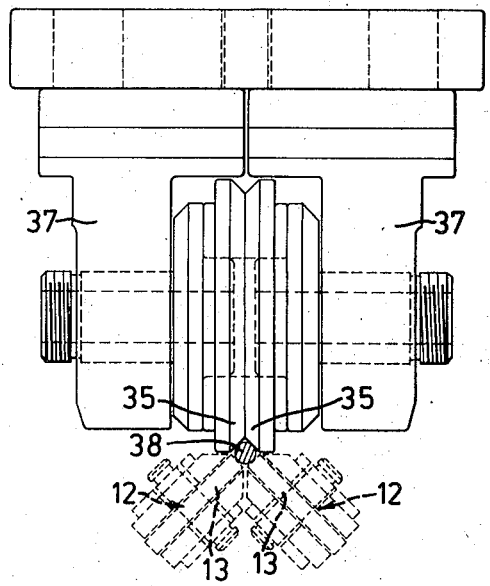
FIG. 6a shows motor driven rollers of the bar feeder of FIG. 1 set to feed a small diameter bar.
Figure 6B:
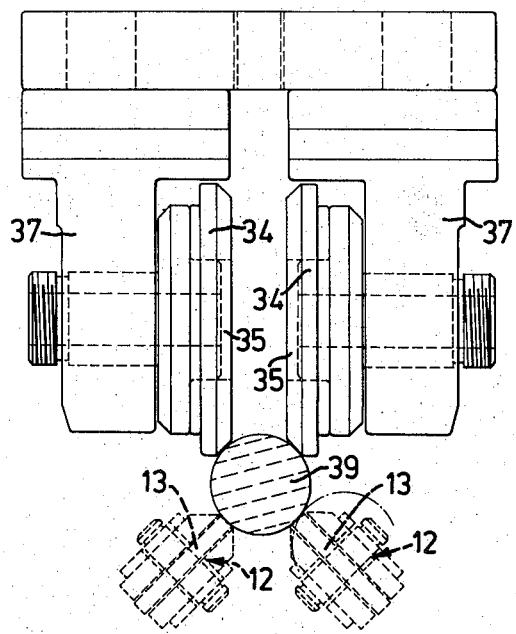
FIG. 6b is a view similar to FIG. 6a but showing the rollers set to feed a large diameter bar.

To feed bar stock material lying in the guideways 6 of the reel 3 longitudinally through the guideways, a pair of motor driven drive rollers 34 are provided at each end of the bar feeder, mounted on the base frame 1 independently of the reel 3, to be sequentially engaged with bar stock held in successive ones of the six guideways 6 as the reel 3 is indexed around. In some machines feed of bar stock material may be required in more than one spindle position, but in the embodiment shown, drive means are only provided in one spindle position. Each of the drive rollers 34 is chamfered to a 45° angle to form a bar abutting faces 35 and the drive rollers 34 are splined or keyed for sliding movement on a drive shaft 36 in respective housings 37. The housings 37 are movable away from and towards one another by mounting them on oppositely handed threads of a spindle which can be rotated by a handwheel. Thus, referring to FIG. 6a it can be seen that the housings 37 can be moved towards one another so that the bar abutting faces 35 of the drive rollers 34 are positioned to engage a small diameter bar 38 to be moved longitudinally through one of the guideways 6 or can be moved apart as shown in FIG. 6b to engage a large diameter bar 39. Each pair of drive rollers 34 together with their housings 37 are reciprocable radially of the guideway 6 in the feed position by means of a respective air cylinder 37a and sliding guides 40, between a radially inward position at which they engage the bar in the adjacent guideway 6 and a radially outward position in which they do not engage the bar.

Cam means (not shown) are provided for controlling the radially inward position to which the drive rollers 34 are driven when the air cylinders 37a are energised.

Figure 7:
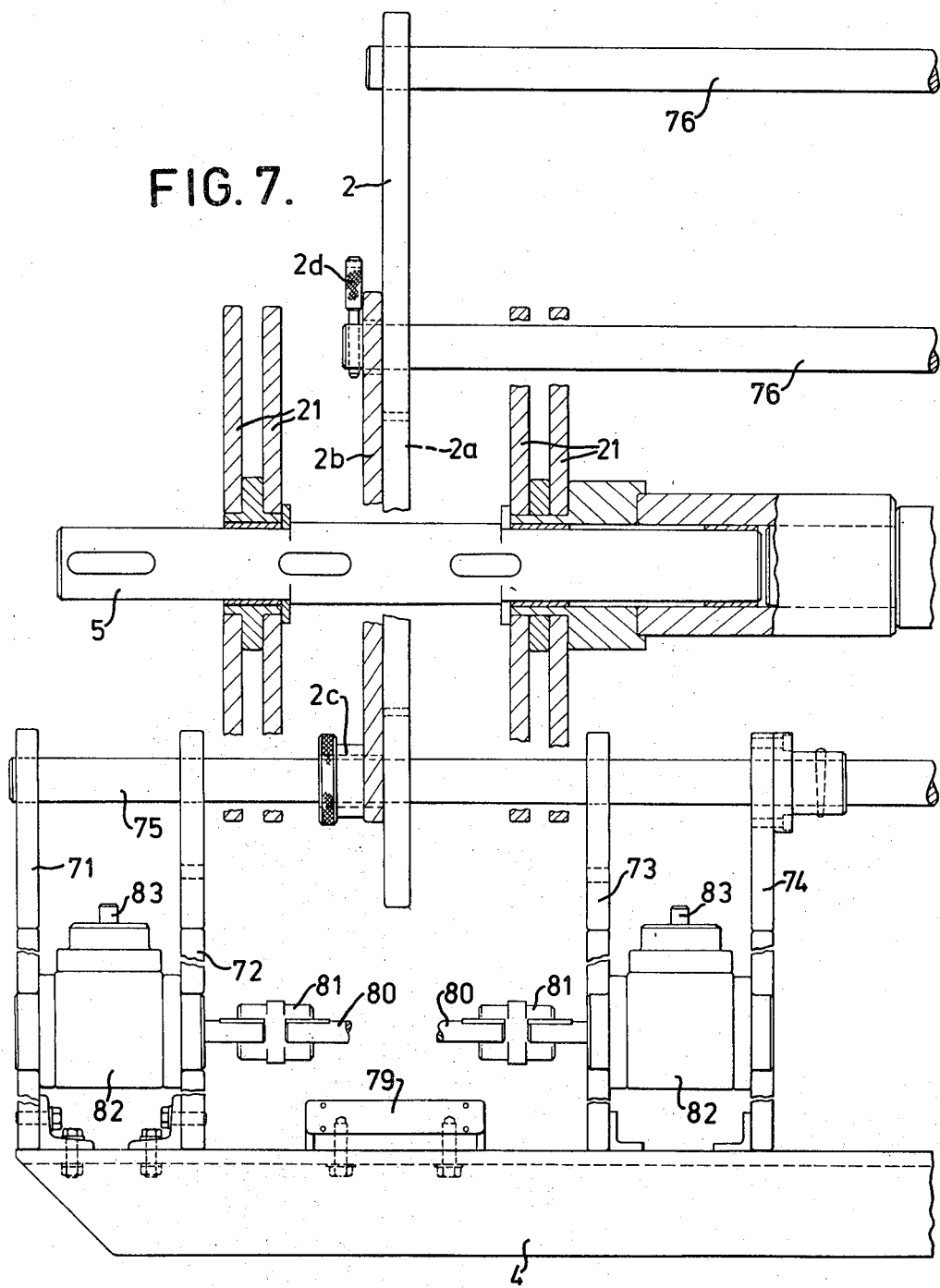
FIG. 7 shows how the bar feeder is supported at the front end of an associated bar holder arrangement.

As shown in FIGS. 1 and 7, the base frame 1 has its channel-shaped support bar 4 cantilevered out from an end frame 70 (not shown in FIG. 7) of the adjacent bar holder arrangement and includes four plates 71, 72, 73 and 74 mounted on the support bar 4. Two torsion bars 75 (only one of which can be seen in FIG. 7) of the frame of the adjacent bar holder arrangement extend through and are secured in the upper ends of the plates 71 to 74. The two torsion bars 75 also extend through the vertical frame plate 2, as do other torsion bars 76 at higher levels. The motor 78 (not shown in FIG. 7) to drive the drive rollers 34 is mounted on an angled mounting 79 and has two oppositely extending drive shafts 80 which, through couplings 81, drive two right-angle drive units 82 mounted respectively between the plates 71 and 72 and the plates 73 and 74. The drive units 82 are mounted to be rockable in bearing apertures in their mounting plates and have output shafts 83 to be connected through universal joints (not shown), to the drive shafts 36 of the drive rollers 34. Mounting the drive units 82 to be rockable permits use of only a single universal joint to couple each output shaft 83 to its respective drive shaft 36 instead of the two universal joints that would otherwise be required.

Figure 6C:
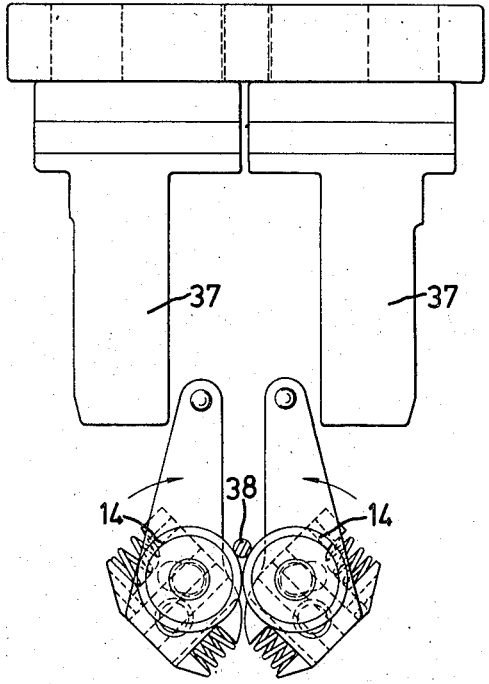
FIG. 6c shows spring-loaded nip rollers for the bar feeder in their normal position.
Figure 6D:
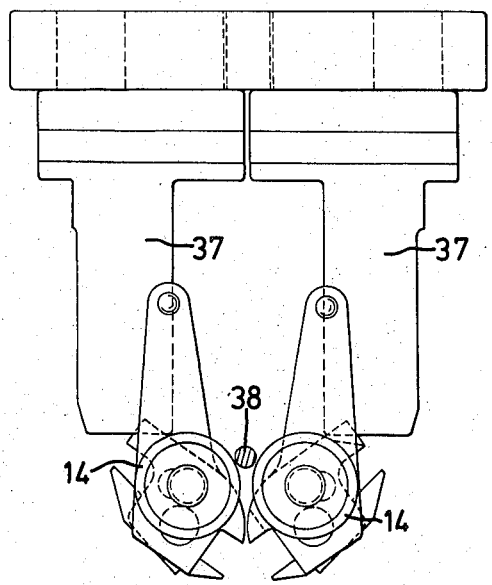
FIG. 6d shows the spring-loaded nip rollers of FIG. 6c pressed to an expanded position.

At each end of each of the inner longitudinal members 12 the dead rolls 13 are provided to project radially inwardly a few thousandths of an inch beyond the inner radial surface of the respective nylon insert 16. At the extreme outer ends of the longitudinal members 12 the nip rollers 14 are provided and are spring-biased for rotation in the directions shown by the arrows on FIG. 6c to the position shown in FIG. 6c. In the position shown in FIG. 6c the nip rollers 14 lift the length of bar stock material 38 out of engagement with the dead rolls 13. When the pairs of drive rollers 34 are driven radially inwardly by their respective air cylinders 37a, the force exerted on the bar 38 by the drive rollers 34 presses the nip rollers 14 apart to the position shown in FIG. 6d to enable the inner side of the bar 38 to engage the dead rolls 13. Rotation of the drive rollers 34 drives the bar 38 axially through the open collet of the machine tool against a dead stop of the machine. Engagement of the bar 38 with the dead stop operates a switch in the dead stop to cause an air cylinder (not shown) to be energised to adjust the position of the cam means controlling the inner radial position of the drive rollers 34 to press the drive rollers away from the bar stock material, say five-thousandths of an inch, so that although still "wiping" the bar 38 the drive rollers are not exerting any great force thereon thereby permitting the nip rollers 14 to spring together to lift the bar 38 off the dead rolls 13. The bar 38 is then partially pushed back through the collet by the dead stop to the required position. Closure of the still rotating collet and consequent snatching of the bar up to machining speed, say 4,000 r.p.m., does not cause marking of the surface of the bar 38 by the edges of the dead rolls 13 since the nip rollers 14 have lifted the bar out of engagement with the dead rolls 13. Closure of the collet is also effective to cause reverse operation of the air cylinders 37a to retract the drive rollers 34 to a radially outward position and to move the cam means to the desired position to set the inner limit of travel of the drive rollers 34 when next operated.

The nip rollers 14 do not need to be adjusted in position when the bar feeder is adjusted for feeding a bar of different size since they are on the ends of the longitudinal members 12 which are themselves adjusted in position.

What is claimed is:

1. A bar feeder, for feeding bar stock material to a machine tool, comprising a reel; means for indexing said reel around about a longitudinal axis; a plurality of guideways extending longitudinally through said reel; each of said guideways being formed by a plurality of longitudinally extending members respectively displaceable radially outwardly and inwardly from the longitudinal axis of each guideway to adjust the diameter of the guideway; clamping means at each end of each of said longitudinally extending members whereby said longitudinally extending members can be clamped in desired positions and can be unclamped and moved in directions radially of the guideway to be clamped in further desired positions; and drive means movable sequentially to engage bars extending through the guideways to move the bars longitudinally therein.

2. Bar feeder as claimed in claim 1, wherein each of said guideways is rotatable about its own axis; said reel includes, adjacent each of said guideways, a respective fixed longitudinally extending member adjacent which each of said displaceable longitudinally extending members of the respective guideway can be brought to lie; and co-operating means on each of said displaceable longitudinally extending members and on each of said fixed longitudinally extending members at each end, between which said co-operating means a block gauge can be inserted to position said displaceable longitudinally extending members at desired distances from the axis of the respective guideway before clamping them against further movement.

3. A bar feeder as claimed in claim 1, wherein said drive means comprises a pair of motor driven rollers, said rollers being mounted for rotation about an axis perpendicular to said axis of the adjacent one of said guideways and being reciprocable in a direction radially of that guideway.

4. A bar feeder as claimed in claim 3, wherein each of said pair of rollers has a face, to engage a bar in a respective guideway, disposed at an angle of 45° to the axis of rotation of the roller, whereby said faces of said pair of guide rollers together form a V with the apex directed towards the axis of rotation of the rollers, and wherein said bar feeder includes means to move said rollers axially relatively to one another to accommodate different sizes of bar to be fed.

5. A bar feeder as claimed in claim 3, and including a further pair of motor driven rollers at an opposite end of said bar feeder to said pair of motor driven rollers to engage a bar at positions beyond the ends of the guideways, the two rollers of each of said pair and said further pair engaging the bar at positions symmetrically on either side of a line passing between the two displaceable longitudinally extending members of the adjacent guideway which are radially outermost.

6. A bar feeder as claimed in claim 1, wherein a segment of said rell is mounted to be removable; said segment is secured in the reel by dowel pins which extend through apertures in end plates of said rell whereby axial sliding movement of said dowel pins can disengage them from said segment and permit the segment to be removed from said reel in a radial direction, said reel is coupled for rotation with the machining head of a machine tool to which the bar feeder is to feed a bar and the coupling between said reel and the machining head is broken when said segment is removed.

7. A bar feeder as claimed in claim 6, wherein said coupling comprises a dog-clutch, one part of which is formed by an inner radial end of said segment, whereby removal of said segment uncouples said reel of the bar feeder from the machining head of the machine tool to permit relative rotation therebetween.

8. A bar feeder as claimed in claim 1, wherein each of said displaceable longitudinally extending members is formed by two parallel strips of metal with a strip of nylon sandwiched therebetween, with the radially inner edges of said strips of metal which are remote from the nylon member chamfered at 45°.

9. A bar feeder as claimed in claim 8, wherein, in each of said guideways, four displaceable longitudinally extending members are provided and the two of said four displaceable longitudinally extending members which are radially innermost in said reel each carry at each of their ends a dead roll projecting radially inwardly of the guideway beyond the faces of respective ones of said nylon members of said displaceable longitudinally extending members and aligned with said nylon members and wherein said dead rolls are each mounted for rotation about an axis perpendicular to the axis of the guideway.

10. A bar feeder as claimed in claim 9 wherein each of said displaceable longitudinally extending members which mounts said dead rolls also mounts, at each of its ends, a spring-loaded nip roller biased by a spring towards the nip roller carried on the other of the displaceable longitudinally extending members of the guideway which mounts said dead rolls and each pair of nip rollers is arranged so that in a normal position they lift the bar in the respective guideway out of engagement with the dead rolls.

11. A bar feeder as claimed in claim 10, wherein said drive means comprises motor driven rollers which are reciprocable in a direction radially of the guideway adjacent thereto by means of an air cylinder which moves the motor driven rollers radially inwardly of the guideway to a limit position determined by a cam.

12. A bar feeder as claimed in claim 1, wherein said guideways each comprise hubs at opposite ends thereof and wherein said clamping means comprise bolts passing through slots in said displaceable longitudinally extending members adjacent their ends, and engaged in lugs provided on said hubs.

* * * * *